(12) United States Patent
Kang et al.

(10) Patent No.: US 8,520,179 B2
(45) Date of Patent: Aug. 27, 2013

(54) WIRING STRUCTURE OF LIQUID CRYSTAL DISPLAY PANEL HAVING GATE, SOURCE AND DRAIN ELECTRODES HORIZONTALLY STAGGERED

(75) Inventors: Liang-Hao Kang, Taipei County (TW); Yi-Cheng Tsai, Taoyuan County (TW)

(73) Assignee: Chunghwa Picture Tubes, Ltd., Padeh, Taoyuan (TW)

( * ) Notice: Subject to any disclaimer, the term of this patent is extended or adjusted under 35 U.S.C. 154(b) by 926 days.

(21) Appl. No.: 12/630,568

(22) Filed: Dec. 3, 2009

(65) Prior Publication Data

US 2011/0063555 A1 Mar. 17, 2011

(30) Foreign Application Priority Data

Sep. 15, 2009 (TW) .............................. 98131087 A (51) Int. Cl.
*G02F 1/1343* (2006.01)
*G02F 1/1345* (2006.01)

(52) U.S. Cl.
USPC ........... 349/149; 349/139; 349/141; 349/147; 345/173; 345/174

(58) Field of Classification Search
USPC ........................... 349/139–149; 345/173, 174
See application file for complete search history.

(56) References Cited

U.S. PATENT DOCUMENTS

| 6,559,524 | B2 | 5/2003 | Seko |
| 7,388,641 | B2 | 6/2008 | Kim |
| 7,663,146 | B2* | 2/2010 | Tanaka et al. ................... 257/72 |
| 8,059,242 | B2* | 11/2011 | Onogi et al. .................. 349/129 |
| 2008/0272484 | A1* | 11/2008 | Myers et al. .................. 257/714 |

FOREIGN PATENT DOCUMENTS

| JP | 2003-249592 | 9/2003 |
| TW | I281366 | 4/2005 |
| TW | I296857 | 8/2005 |

* cited by examiner

*Primary Examiner* — Huyen Ngo
(74) *Attorney, Agent, or Firm* — Muncy, Geissler, Olds & Lowe, PLLC (57) ABSTRACT

A wiring structure of a liquid crystal display (LCD) panel is provided. The wiring structure includes: a gate electrode layer, formed on a glass substrate; a first insulating layer, covering the glass substrate and partially formed on the gate electrode layer, such that at least one first opening is defined on the gate electrode layer; a source/drain electrode layer, formed on the first insulating layer, in which the source/drain electrode layer and the gate electrode layer are horizontally staggered; a second insulating layer, partially formed on the source/drain electrode layer, and defining at least one second opening on the source/drain electrode layer; and an indium tin oxide (ITO) layer, formed on the first opening, the second opening, and/or the second insulating layer. Thus, the high impedance of the ITO layer for connecting the gate electrode layer with the source/drain electrode layer is reduced.

12 Claims, 11 Drawing Sheets

WIRING STRUCTURE OF LIQUID CRYSTAL DISPLAY PANEL HAVING GATE, SOURCE AND DRAIN ELECTRODES HORIZONTALLY STAGGERED

CROSS-REFERENCE TO RELATED APPLICATION

This application claims the benefit of Taiwan Patent Application No. 098131087, filed on Sep. 15, 2009, which is hereby incorporated by reference for all purposes as if fully set forth herein.

BACKGROUND OF THE INVENTION

1. Field of Invention

The present invention relates to a liquid crystal display (LCD) panel, and more particularly to a wiring structure of an LCD panel, which has a double metal layer structure and is capable of reducing wiring impedance.

2. Related Art

In currently known technologies, as for display devices employing a Chip On Film (COF) technology, the metal wiring employing the COF technology has a higher impedance than that of conventional devices using a printed wiring board (PWB) for signal transmission, so that when the COF wiring impedance is high, the mura problem of tape automated bonding (TAB) easily occurs, thereby affecting the quality of the panel. In order to reduce the wiring impedance, a double-layer metal wiring structure is used.

Figure 1:
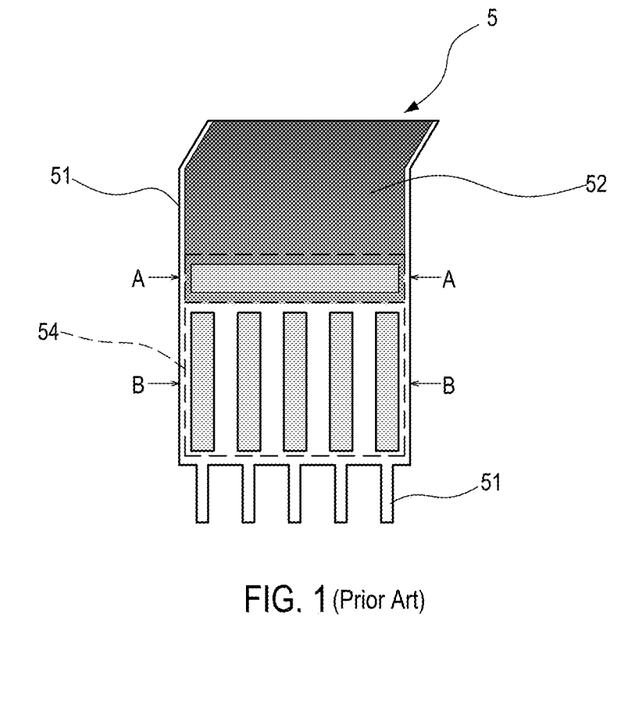
FIG. 1 is a top view of a double-layer metal wiring structure in the prior art.
Figure 2:
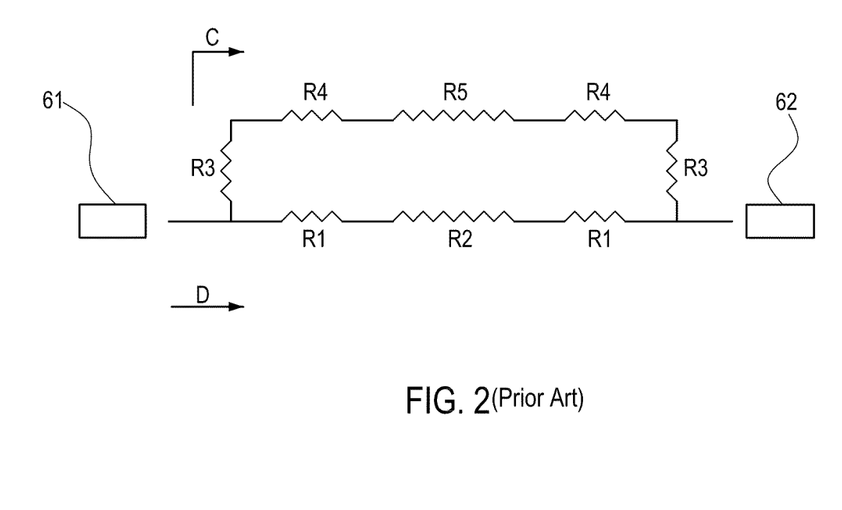
FIG. 2 is an equivalent circuit diagram of the double-layer metal wiring structure in the prior art.
Figure 3A:
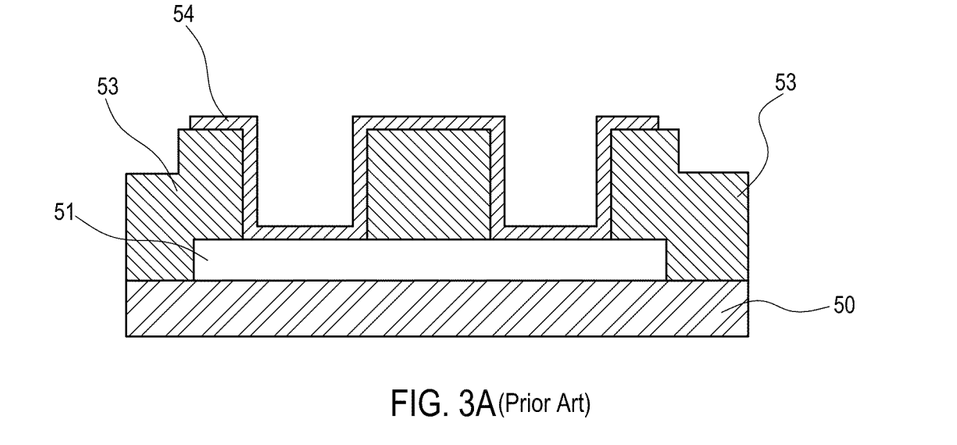
FIG. 3A is a cross-sectional view of the double-layer metal wiring structure in the prior art, taken along Line A-A.
Figure 3B:
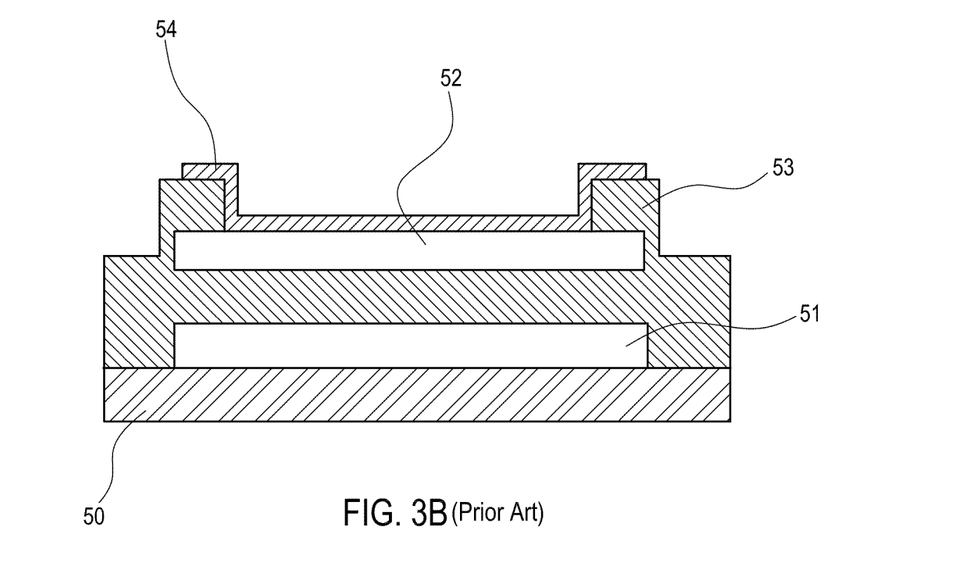
FIG. 3B is a cross-sectional view of the double-layer metal wiring structure in the prior art, taken along Line B-B.

FIG. 1 is a top view of a double-layer metal wiring structure in the prior art. FIG. 2 is an equivalent circuit diagram of the double-layer metal wiring structure in the prior art. FIG. 3A is a cross-sectional view of the double-layer metal wiring structure in the prior art, taken along Line A-A. FIG. 3B is a cross-sectional view of the double-layer metal wiring structure in the prior art, taken along Line B-B. Referring to FIGS. 1, 2, 3A, and 3B, since a signal needs to pass through a double-layer metal wiring structure 5 (formed on a glass substrate 50), the signal needs to be transmitted to a source/drain electrode layer 52 through an indium tin oxide (ITO) layer 54, such that a gate electrode layer 51 and the source/drain electrode layer 52 can transmit the COF signals at the same time. Definitely, an insulating layer 53 is completely or partially formed between the gate electrode layer 51, the source/drain electrode layer 52, and the ITO layer 54, so as to provide electrical insulation there-between.

For example, in the double-layer metal wiring structure 5, when a signal of a source integrated circuit (IC) 61 is transmitted by the gate electrode layer 51, the signal needs to be transmitted to a gate IC 62 through an impedance R1 of the ITO layer and the gate electrode layer, an impedance R2 of the gate electrode layer, and the impedance R1 of the gate electrode layer and the ITO layer, that is, along a direction represented by Arrow D; and when the signal is transmitted by the source/drain electrode layer 52, the signal needs to be transmitted to the gate IC 62 through an impedance R3 of the ITO layer, an impedance R4 of the ITO layer and the source/drain electrode layer, an impedance R5 of the source/drain electrode layer, the impedance R4 of the source/drain electrode layer and the ITO layer, and the impedance R3 of the ITO layer, that is, along a direction represented by Arrow C (as shown in FIG. 2).

Since the signal must be conducted to the double-layer metal, the ITO layer 54 is additionally used as a jump layer for conducting the signal on the gate electrode layer 51 to the source/drain electrode layer 52, thereby transmitting the signal through the double-layer metal.

However, since the ITO layer 54 has a high impedance, that is, the impedance of the ITO layer 54 is about 80 times of that of aluminum, the signal loss occurs when the signal on the gate electrode layer 51 is transmitted to the source/drain electrode layer 52, resulting in that the original signal cannot be kept intact after being transmitted through the double-layer metal.

SUMMARY OF THE INVENTION

To solve the above problem, an objective of the present invention is to provide a double-layer metal structure, in which a gate electrode layer and a source/drain electrode layer are horizontally staggered, so as to reduce the impedance when a signal passes through the double-layer metal structure, thereby solving the problem that the signal cannot be kept intact after being transmitted due to signal loss.

Another objective of the present invention is to reduce the segmental difference between adjacent wiring structures.

To achieve the above objective, the present invention provides a wiring structure of a liquid crystal display (LCD) panel, which comprises a gate electrode layer, formed on a glass substrate; a first insulating layer, covering the glass substrate and partially formed on the gate electrode layer, such that at least one first opening is formed on the gate electrode layer; a source/drain electrode layer, formed on the first insulating layer, wherein the source/drain electrode layer and the gate electrode layer are horizontally staggered; a second insulating layer, partially formed on the source/drain electrode layer, and defining at least one second opening on the source/drain electrode layer; and an indium tin oxide (ITO) layer, formed on the first opening of the gate electrode layer, the second opening of the source/drain electrode layer, and/or the second insulating layer.

In the above mentioned wiring structure of an LCD panel, the first opening is further attached to an integrated circuit (IC) pad and the second opening is further attached to an integrated circuit (IC) pad.

In the above mentioned wiring structure of an LCD panel, when the gate electrode layer is made of a metal material that is not readily oxidized, the ITO layer is only formed on the second opening of the source/drain electrode layer and the second insulating layer.

In the above mentioned wiring structure of an LCD panel, when the source/drain electrode layer is made of a metal material that is not readily oxidized, the ITO layer is only formed on the first opening of the gate electrode layer and the second insulating layer.

In the above mentioned wiring structure of an LCD panel, the ITO layer is partially formed on the first opening of the gate electrode layer and/or the second opening of the source/drain electrode layer.

To achieve the above objective, the present invention provides a liquid crystal display (LCD) panel, which comprises: a glass substrate, having a display region and a wiring region; and a wiring structure, formed on the wiring region of the glass substrate, and the wiring structure comprises:

a gate electrode layer, formed on the glass substrate;

a first insulating layer, covering the glass substrate and partially formed on the gate electrode layer, such that at least one first opening is formed on the gate electrode layer;

a source/drain electrode layer, formed on the first insulating layer, wherein the source/drain electrode layer and the gate electrode layer are horizontally staggered;

a second insulating layer, partially formed on the source/drain electrode layer, and defining at least one second opening on the source/drain electrode layer; and an indium tin oxide (ITO) layer, formed on the first opening of the gate electrode layer, the second opening of the source/drain electrode layer, and/or the second insulating layer.

DETAILED DESCRIPTION OF THE INVENTION

Figure 4:
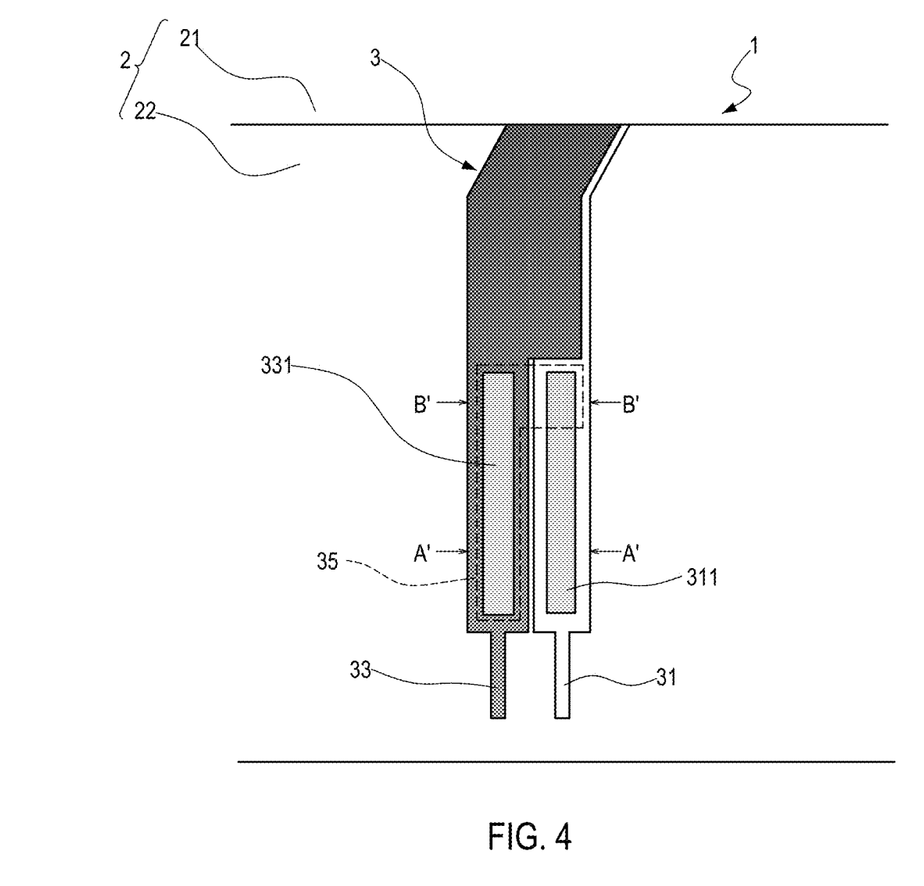
FIG. 4 is a top view of a basic structure of the present invention.
Figure 5A:
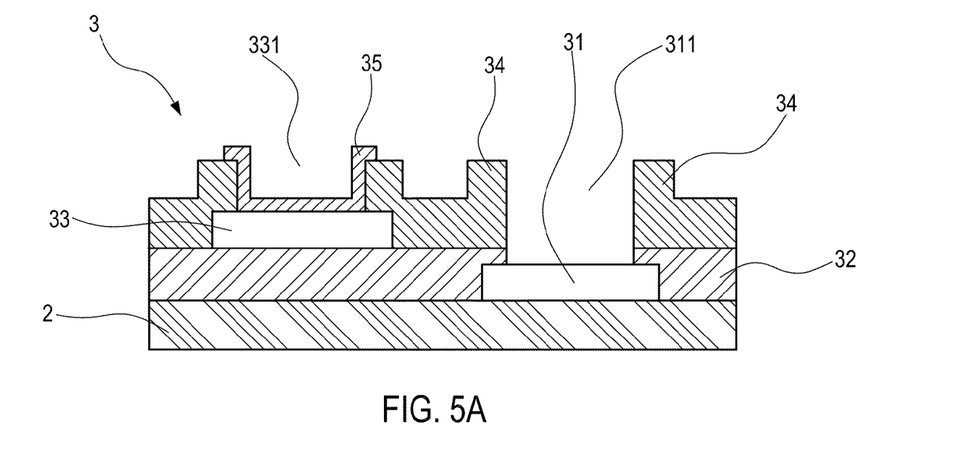
FIG. 5A is a cross-sectional view of the basic structure of the present invention taken along Line A'-A'.
Figure 5B:
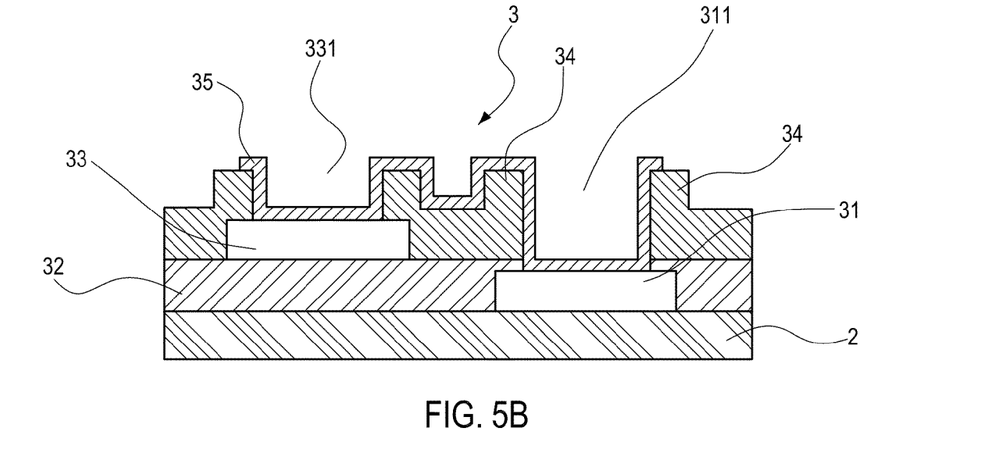
FIG. 5B is a cross-sectional view of the basic structure of the present invention taken along Line B'-B'.

FIG. 4 is a top view of a basic structure of the present invention. FIG. 5A is a cross-sectional view of the basic structure of the present invention taken along Line A'-A'. FIG. 5B is a cross-sectional view of the basic structure of the present invention taken along Line B'-B'. Referring to FIGS. 4, 5A, and 5B, an LCD panel 1 of the present invention has a glass substrate 2 and a wiring structure 3. The glass substrate 2 has a display region 21 and a wiring region 22. The wiring structure 3 is formed on the wiring region 22 of the glass substrate 2.

Taking a basic structure as an example, the wiring structure 3 includes a gate electrode layer 31, a first insulating layer 32, a source/drain electrode layer 33, a second insulating layer 34, and an ITO layer 35.

The gate electrode layer 31 is formed on the glass substrate 2. In particular, the gate electrode layer 31 is formed on the wiring region 22 of the glass substrate 2. The first insulating layer 32 covers the glass substrate 2, and is partially formed on the gate electrode layer 31, such that a first opening 311 is defined on the gate electrode layer 31. The source/drain electrode layer 33 is formed on the first insulating layer 32, and the source/drain electrode layer 33 and the gate electrode layer 31 are horizontally staggered without overlapping each other. The second insulating layer 34 is partially formed on the source/drain electrode layer 33, and defines a second opening 331 on the source/drain electrode layer 33. The ITO layer 35 is formed on the first opening 311 of the gate electrode layer 31, the second opening 331 of the source/drain electrode layer 33, and/or the second insulating layer 34. The first opening 311 and the second opening 331 are configured to be attached to an integrated circuit (IC) pad.

Since the wiring structure 3 is illustrated by taking the basic structure as an example, the numbers of the first opening 311 and the second opening 331 corresponding to the gate electrode layer 31 and the source/drain electrode layer 33 are not limited to one, but may be increased according to design requirements, and the positions of the gate electrode layer 31 and the source/drain electrode layer 33 relative to each other may also be changed.

Embodiments are illustrated below by taking the total number of the first opening 311 and the second opening 331 being five as an example.

Figure 6A:
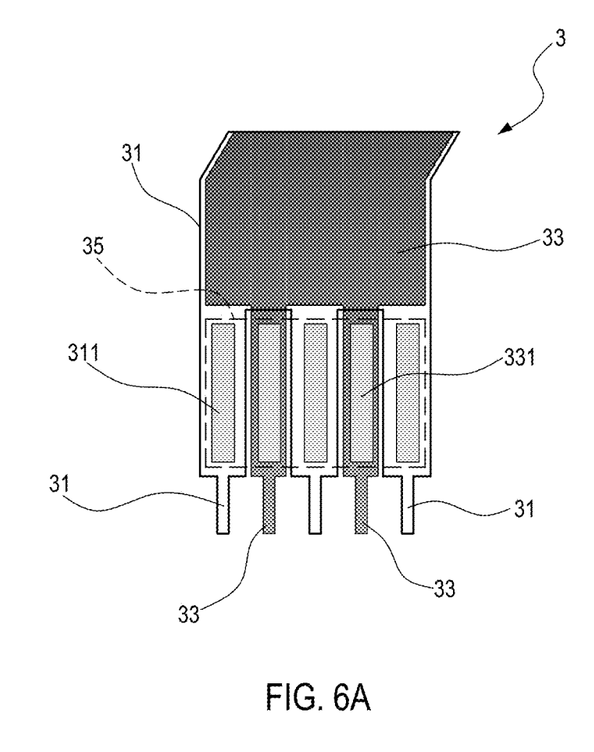
FIG. 6A is a top view of a first embodiment of the present invention.
Figure 6B:
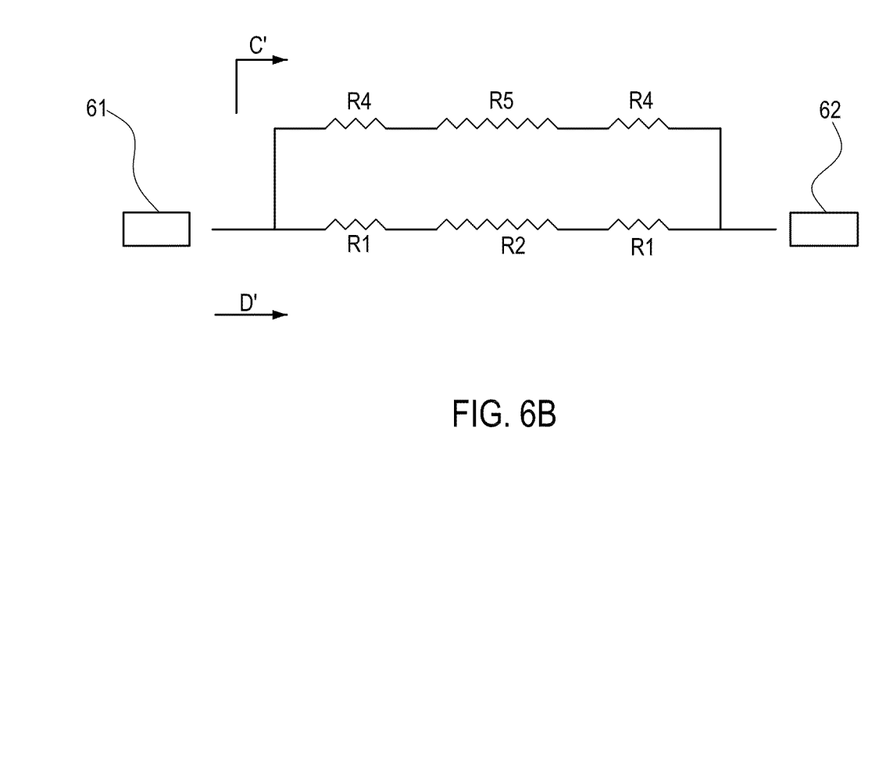
FIG. 6B is an equivalent circuit diagram of the first embodiment of the present invention.

FIG. 6A is a top view of a first embodiment of the present invention. FIG. 6B is an equivalent circuit diagram of the first embodiment of the present invention. Referring to FIGS. 6A and 6B, since an ordinary COF wiring structure mostly has more than two signal pins, the arrangement of the signal pins (that is, the first opening 311 and the second opening 331) in the horizontal direction is changed from the original arrangement of GE/GE/GE/GE/GE (GE represents a gate electrode layer 51) into a staggered arrangement GE/SD/GE/SD/GE (GE represents the gate electrode layer 51, and SD represents the source/drain electrode layer 33) (taking the 5 PIN signal as an example), and outside the first opening 311 and the second opening 331, the metal wiring is extended to the width of all signal pins, thereby achieving the signal transmission by the double-layer metal wiring.

Since the signal in the first opening 311 and the second opening 331 is transmitted to the double-layer metal, the source/drain electrode layer 33 does not need to transmit the signal from the gate electrode layer 31 by additionally using the ITO layer 35 outside the first opening 311 and the second opening 331. That is, as compared with the prior art (as shown in FIGS. 1 and 2), in the double-layer metal wiring structure 3 of the present invention, when a signal of the source IC 61 is transmitted by the gate electrode layer 31, the signal needs to be transmitted to the gate IC 62 through an impedance R1 of the ITO layer and the gate electrode layer, an impedance R2 of the gate electrode layer, the impedance R1 of the gate electrode layer and the ITO layer, that is, along a direction represented by Arrow D'; however, when the signal is transmitted by the source/drain electrode layer 33, the signal does not need to be transmitted through an impedance R3 of the ITO layer first (as shown in FIG. 2), but only needs to be transmitted to the gate IC 62 through an impedance R4 of the ITO layer and the source/drain electrode layer, an impedance R5 of the source/drain electrode layer, and the impedance R4 of the source/drain electrode layer and the ITO layer, that is, along a direction represented by Arrow C' (as shown in FIG. 6B), so as to reduce the signal loss caused by the high impedance of the ITO layer 35 (for example, the R3 as shown in FIG. 2).

Figure 7:
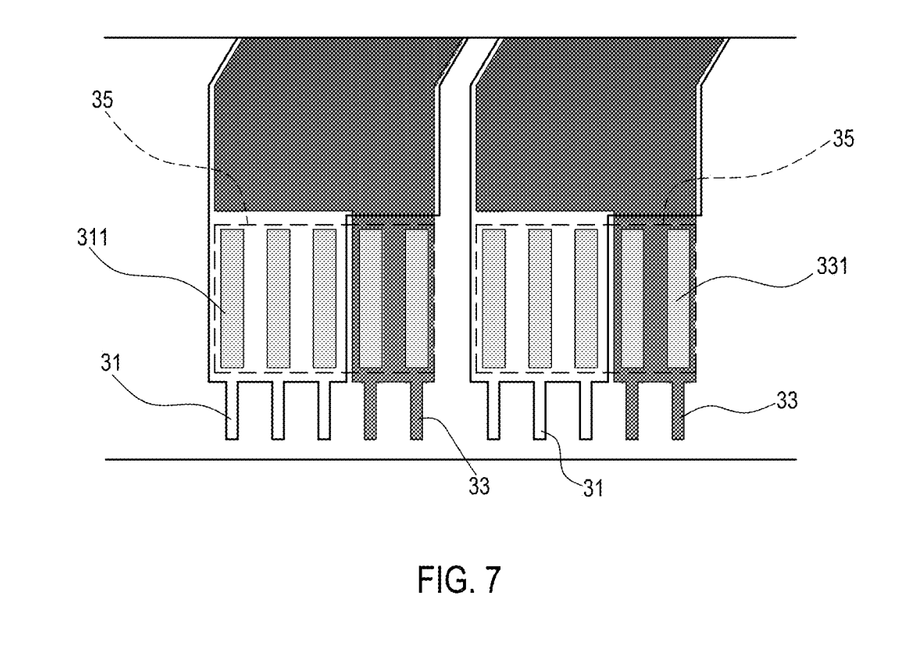
FIG. 7 is a top view of a second embodiment of the present invention.

FIG. 7 is a top view of a second embodiment of the present invention. The signal pins (that is, the first opening 311 and the second opening 331) are configured in a form of GE/GE/GE/SD/SD, and pins of the same signal are configured for the gate electrode layer 31 and the source/drain electrode layer 33 half by half, that is, three first openings 311 are respectively disposed on three adjacent gate electrode layers 31, and two second openings 331 are respectively disposed on two adjacent source/drain electrode layers 33; and outside the first openings 311 and the second openings 331, the metal wiring is extended to the width of all signal pins, thereby achieving the signal transmission by the double-layer metal wiring.

Likewise, since the signal in the first opening 311 and the second opening 331 is transmitted to the double-layer metal, the source/drain electrode layer 33 does not need to transmit the signal from the gate electrode layer 31 by additionally using the ITO layer 35 outside the first opening 311 and the second opening 331, such that the signal loss caused by the high impedance of the ITO layer 35 (for example, the R3 as shown in FIG. 2) is reduced.

Figure 8:
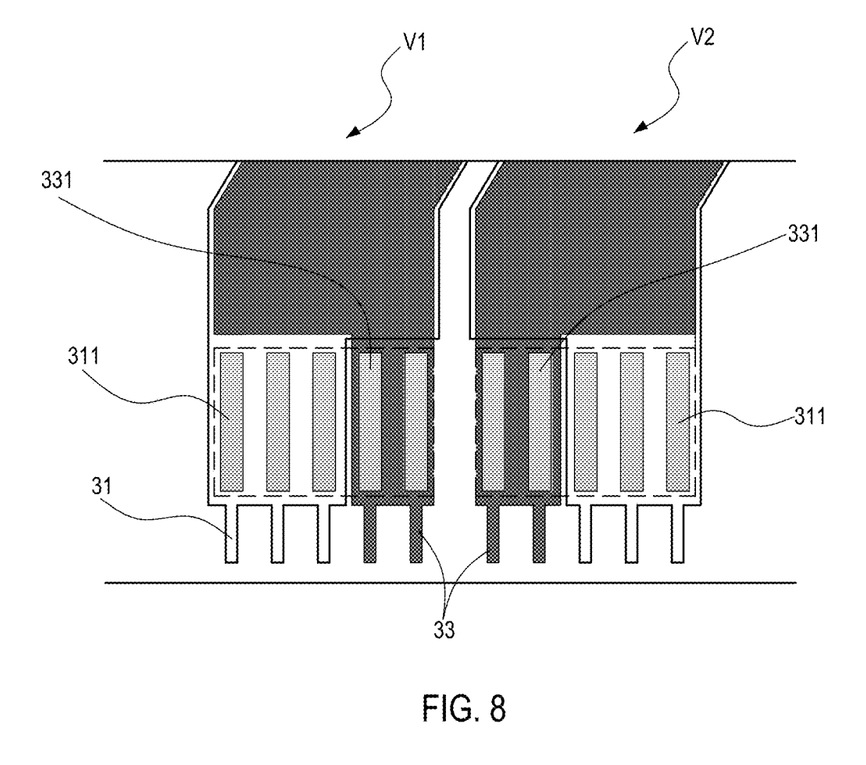
FIG. 8 is a top view of a third embodiment of the present invention.

FIG. 8 is a top view of a third embodiment of the present invention. The structure of this embodiment is approximately the same as that of the second embodiment. However, since metal pins (that is, the first opening 311 and the second opening 331) are configured for the gate electrode layer 31 and the source/drain electrode layer 33 half by half, a segmental difference may occur. Therefore, an adjacent portion between two wiring structures 3 is configured with the same metal pins, so as to reduce the influences caused by the segmental difference. Taking a power supply voltage (VSS) signal V1 and a driving voltage (VDD) signal V2 as an example, the left portion of the VSS is the pins of the gate electrode layer 31, and the right portion thereof is the pins of the source/drain electrode layer 33, so that the left portion of the VDD is configured with the pins of the same source/drain electrode layer 33, and the right portion thereof is configured with the pins of the gate electrode layer 31, and so on. Thus, the segmental difference generated between adjacent wiring structures is avoided.

Figure 9:
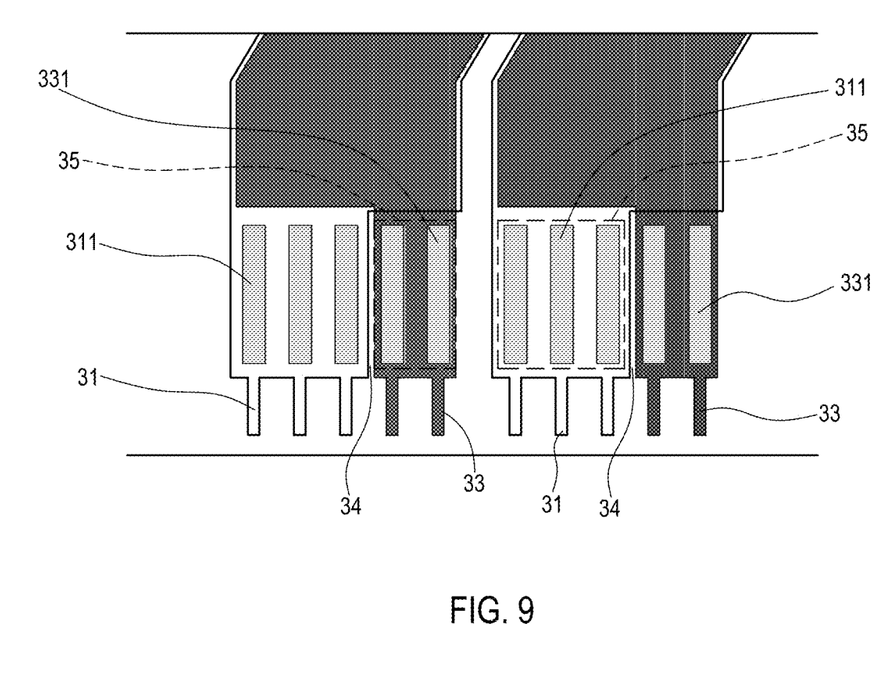
FIG. 9 is a top view of a fourth embodiment of the present invention.
Figure 10:
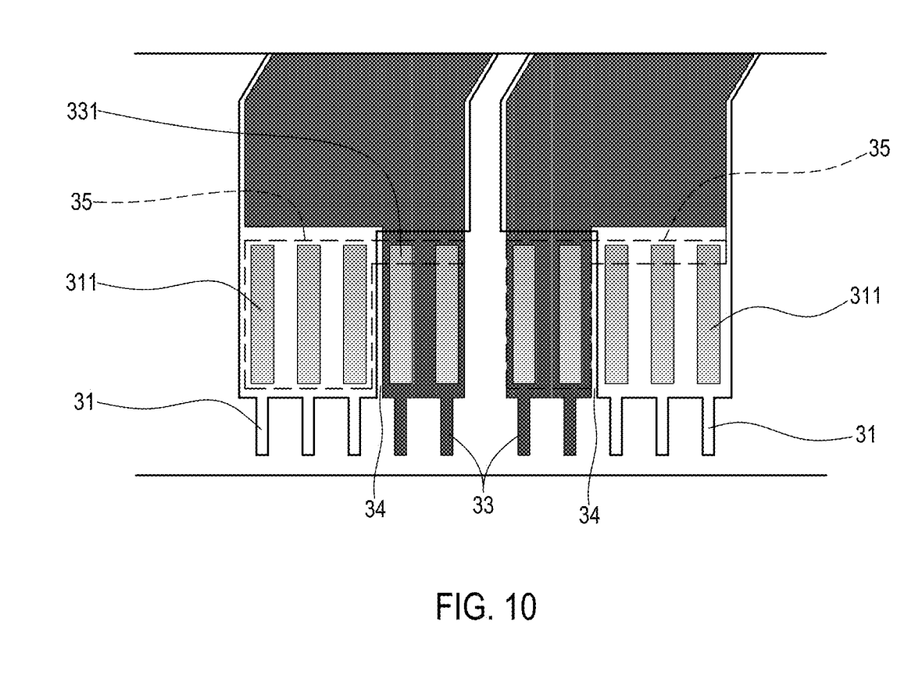
FIG. 10 is a top view of a fifth embodiment of the present invention.

FIG. 9 is a top view of a fourth embodiment of the present invention. FIG. 10 is a top view of a fifth embodiment of the present invention. The structure of the fourth embodiment is approximately the same as that of the second embodiment, and the structure of the fifth embodiment is approximately the same as that of the third embodiment.

When the gate electrode layer 31 is made of a metal material that is not readily oxidized, that is, when the metal material of the gate electrode layer 31 (the structure on the right side of FIG. 9) or the source/drain electrode layer 33 (the structure on the left side of FIG. 9) is not readily oxidized, the ITO layer 35 is only formed on the second opening 331 of the source/drain electrode layer 33 and the second insulating layer 34, so that it is unnecessary to cover the ITO layer 35 on the pins (that is, the first opening 311 and the second opening 331) (as shown in FIG. 9).

When the pins (that is, the first opening 311 and the second opening 331) do not need to be covered by the ITO layer 35, that is, when the source/drain electrode layer 33 is made of a metal material that is not readily oxidized, an incomplete ITO layer 35 may be added, such that the ITO layer 35 is partially formed on the gate electrode layer 31 (the structure on the right side of FIG. 10) or the source/drain electrode layer 33 (the structure on the left side of FIG. 10). That is, the ITO layer 35 is merely formed on the first opening 311 of the gate electrode layer 31 and the second insulating layer 34, so as to electrically connect the pins (that is, the first opening 311 and the second opening 331) (as shown in FIG. 10).

Therefore, through the illustration of the above structures and embodiments, the wiring structure of the present invention and the LCD panel using the wiring structure can reduce the impedance between the double-layer metal, so as to reduce the signal loss during the signal transmission, and avoid the segmental difference between adjacent wiring structures.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A wiring structure of a liquid crystal display (LCD) panel, comprising:
    a gate electrode layer, formed on a glass substrate;
    a first insulating layer, covering the glass substrate and partially formed on the gate electrode layer, such that at least one first opening is formed on the gate electrode layer;
    a source/drain electrode layer, formed on the first insulating layer, wherein the source/drain electrode layer and the gate electrode layer are horizontally staggered;
    a second insulating layer, partially formed on the source/drain electrode layer, and defining at least one second opening on the source/drain electrode layer; and
    an indium tin oxide (ITO) layer, formed on the first opening of the gate electrode layer, the second opening of the source/drain electrode layer, and/or the second insulating layer.

2. The wiring structure of an LCD panel according to claim 1, wherein the first opening is further attached to an integrated circuit (IC) pad.

3. The wiring structure of an LCD panel according to claim 1, wherein the second opening is further attached to an integrated circuit (IC) pad.

4. The wiring structure of an LCD panel according to claim 1, wherein when the gate electrode layer is made of a metal material that is not readily oxidized, the ITO layer is only formed on the second opening of the source/drain electrode layer and the second insulating layer.

5. The wiring structure of an LCD panel according to claim 1, wherein when the source/drain electrode layer is made of a metal material that is not readily oxidized, the ITO layer is only formed on the first opening of the gate electrode layer and the second insulating layer.

6. The wiring structure of an LCD panel according to claim 1, wherein the ITO layer is partially formed on the first opening of the gate electrode layer and/or the second opening of the source/drain electrode layer.

7. A liquid crystal display (LCD) panel, comprising:
    a glass substrate, having a display region and a wiring region; and
    a wiring structure, formed on the wiring region of the glass substrate, and comprising:
        a gate electrode layer, formed on the glass substrate;
        a first insulating layer, covering the glass substrate and partially formed on the gate electrode layer, such that at least one first opening is formed on the gate electrode layer;
        a source/drain electrode layer, formed on the first insulating layer, wherein the source/drain electrode layer and the gate electrode layer are horizontally staggered;
        a second insulating layer, partially formed on the source/drain electrode layer, and defining at least one second opening on the source/drain electrode layer; and
        an indium tin oxide (ITO) layer, formed on the first opening of the gate electrode layer, the second opening of the source/drain electrode layer, and/or the second insulating layer.

8. The wiring structure of an LCD panel according to claim 7, wherein the first opening is further attached to an integrated circuit (IC) pad.

9. The wiring structure of an LCD panel according to claim 7, wherein the second opening is further attached to an integrated circuit (IC) pad.

10. The wiring structure of an LCD panel according to claim 7, wherein when the gate electrode layer is made of a metal material that is not readily oxidized, the ITO layer is only formed on the second opening of the source/drain electrode layer and the second insulating layer.

11. The wiring structure of an LCD panel according to claim 7, wherein when the source/drain electrode layer is made of a metal material that is not readily oxidized, the ITO layer is only formed on the first opening of the gate electrode layer and the second insulating layer.

12. The wiring structure of an LCD panel according to claim 7, wherein the ITO layer is partially formed on the first opening of the gate electrode layer and/or the second opening of the source/drain electrode layer.

* * * * *